United States Patent [19]

Kunzman et al.

[11] Patent Number: 5,230,151
[45] Date of Patent: Jul. 27, 1993

[54] HEAVY DUTY SHEAR HEAD AND MOUNTING SUPPORT

[75] Inventors: Kevin M. Kunzman, Willoughby; Robert L. Truelsch, Burton, both of Ohio

[73] Assignee: N.P.K. Construction Equipment, Inc., Walton Hills, Ohio

[21] Appl. No.: 842,239

[22] Filed: Feb. 26, 1992

[51] Int. Cl.$^5$ .................... B26B 1/00; B26B 3/00; B26B 15/00; B66C 1/00
[52] U.S. Cl. ...................... 30/134; 30/131; 30/228; 414/740
[58] Field of Search ............ 30/92, 134, 228, 131, 30/128; 83/928, 609; 37/117.5; 173/46; 414/912, 740

[56] References Cited

U.S. PATENT DOCUMENTS

| | | | |
|---|---|---|---|
| 4,403,431 | 9/1983 | Ramun et al. | 30/134 |
| 4,450,625 | 5/1984 | Raumn et al. | 30/134 |
| 4,519,135 | 5/1985 | LaBounty | 30/134 |
| 4,543,719 | 10/1985 | Pardoe | 30/134 |
| 4,558,515 | 12/1985 | LaBounty | 30/134 |
| 4,616,417 | 10/1914 | Gross | 30/134 |
| 4,669,187 | 6/1987 | Pardoe | 30/134 |
| 4,670,983 | 6/1987 | Ramun et al. | 30/134 |
| 4,686,767 | 8/1987 | Raumn et al. | 30/134 |
| 4,719,975 | 6/1988 | LaBounty | 173/46 |
| 4,771,540 | 9/1988 | LaBounty | 30/134 |
| 4,776,093 | 10/1988 | Gross et al. | 30/134 |
| 4,776,524 | 10/1988 | Sakato | 241/263 |
| 4,908,946 | 3/1990 | LaBounty | 30/134 |

OTHER PUBLICATIONS

Wolff Mfg. Co. 2 page brochure on Goriga NP07.
La Bounty 6 page brochure Sep. 1987.
La Bounty 4 page brochure Jan. 1991.
Ten page publication on Dudley Shearing Products.
Materials on Allied-Gator Shears.

Primary Examiner—Frank T. Yost
Assistant Examiner—Paul M. Heyrana, Sr.
Attorney, Agent, or Firm—Body, Vickers & Daniels

[57] ABSTRACT

A heavy duty shear attachable to the boom of a mobile machine, such as a backhoe, comprises a support structure of welded steel plate construction, and a shear head of steel plate construction mounted on the support structure and having pivotally interconnected upper and lower jaw members. The upper and lower jaw members carry removable shearing blade inserts which are dimensionally identical, and the jaw members are pivotally interconnected by a joint assembly which facilitates disassembly thereof for maintenance purposes.

48 Claims, 6 Drawing Sheets

HEAVY DUTY SHEAR HEAD AND MOUNTING SUPPORT

BACKGROUND OF THE INVENTION

The present invention relates to heavy duty shears of the type mountable on the boom of a mobile machine such as a backhoe and, more particularly, to improvements in the structure of a shear head and the supporting structure by which the head is adapted to be mounted on the boom.

Heavy duty shears of the type to which the improvements of the present invention are directed are well known in conjunction with the handling and shearing of a wide variety of scrap materials including, for example, iron and steel pipes of various diameters, iron and steel solid rod of various cross-sections and diameters, structural beams such as I-beams, channels and angles, as well as a variety of other metallic and non-metallic materials and material configurations. Generally, the shear head includes a supporting structure by which the head is adapted to be attached to the boom of a mobile machine, such as a backhoe, and the shearing components are relatively pivotal and powered by a hydraulic piston and cylinder arrangement which is actuated through the hydraulic system of the machine. Various prior art shears of the foregoing character are illustrated, for example, in U.S. Pat. No. 4,519,135 to LaBounty; U.S. Pat. No. 4,450,625 to Ramun et al; U.S. Pat. No. 4,558,515 to LaBounty; U.S. Pat. No. 4,616,417 to Gross; U.S. Pat. No. 4,670,983 to Ramun et al; U.S. Pat. No. 4,686,767 to Ramun et al; U.S. Pat. No. 4,719,975 to LaBounty; and U.S. Pat. No. 4,908,946 to LaBounty.

While the foregoing and other shears heretofore available are operative for their intended purposes, there are a number of disadvantages attendant to the manufacture, structure and maintenance thereof which result in the devices being difficult and expensive to construct and to maintain. Moreover, such disadvantages affect the efficiency of operation of the shear and the life of component parts thereof and, especially in connection with maintenance, make it extremely difficult and expensive, and impossible in certain circumstances, to perform maintenance on the apparatus in the field. All of these disadvantages add to the cost of construction, operating and maintaining the apparatus.

SUMMARY OF THE INVENTION

In accordance with the present invention, improvements are provided in connection with the structure of a heavy duty shear which result in a shear and component parts thereof which minimize or avoid the disadvantages encountered in connection with prior art devices, including those enumerated hereinabove. More particularly, and in accordance with one aspect of the invention, the relatively pivotal shearing components of a heavy duty shear are adapted to be mounted on the boom of a mobile machine, such as a backhoe, through a support structure of welded box-beam construction. The support is constructed from steel plate material and promotes efficiency in manufacture and a lighter weight support structure without sacrificing structural integrity. Furthermore, the welded steel plate construction facilitates maintenance and repair of the support in the field, thus reducing maintenance cost and down time required in connection with having to transport the apparatus back to a shop for repair and maintenance operations.

In accordance with another aspect of the invention, the shear head of a heavy duty shear is of welded steel plate construction. As with the support discussed above, such construction promotes a reduction in manufacturing costs and in the weight of the shear head without sacrificing structural integrity. Further, the steel plate construction promotes both ease and economy in connection with making changes or design modifications during the manufacturing process and/or in connection with the construction of subsequent apparatus. Further in accordance with the present invention, the shear head includes upper and lower jaw members each provided with a pair of hardened shearing blade inserts which are removably mountable on the jaw members to facilitate removal and reorientation or replacement thereof as is necessary to maintain sharp cutting edges. As is well known, each such insert has four cutting edges whereby the insert is remountable in different orientations to promote the life of the insert before it has to be replaced. However, in the shear heads heretofore available, all of the shearing blade inserts are not dimensionally identical, and at least one of the blade inserts is longer or shorter than the others. In accordance with the present invention, all of the shearing blade inserts in a shear head are dimensionally identical, including the lengths thereof, and this promotes economy with respect to manufacturing the inserts and with respect to maintaining an inventory of blade inserts by eliminating the need to have an inventory of a variety of blades of different lengths. Furthermore, by having all of the blade inserts of the same length, the blades are universally interchangeable in the shear head and this optimizes use of the full length of each cutting edge on each insert, thus providing a longer life for each insert than heretofore possible and, accordingly, a considerable and meaningful reduction in maintenance costs attendant to the replacement of used blade inserts.

The welded steel plate construction for the shear head further facilitates welding a shearing blade insert support plate and a guide blade support plate on the lower jaw plates of the shear head. The support plates provide supporting recesses for the shearing blade inserts and a guide blade insert to provide the desired structural integrity with respect to supporting the inserts while promoting the ease and economy of the construction of the shear head. The lower jaw plate which supports the guide blade and which is spaced from the lower jaw plate which supports the lower shearing blade inserts has an upper surface portion spaced below the latter inserts a distance sufficient to assure that a workpiece is completely severed before the latter engages the upper surface portions referred to. This precludes any potential damage to the component parts of the shear head, such as by engagement of non-cutting parts with the workpiece. In accordance with a further aspect of the present invention, the upper surface portions of the jaw plate supporting the guide blade insert are inclined laterally outwardly and downwardly of the jaw plate to provide a clearance area which allows a portion of the workpiece extending across the latter to bend downwardly to an inclined disposition under its own weight during the shearing operation and prior to the completion thereof without engaging the guide blade jaw plate. This further assures completion of the shearing of the workpiece before the latter drops into engagement with the upper edge of the latter jaw plate and advantageously promotes displacement of the cut portion of the workpiece from the guide blade jaw plate following the shearing operation.

In accordance with another aspect of the invention, an improved pivotal interconnection is provided between the relatively pivotal jaw members of a shear head to promote the ease of field maintenance with respect to this portion of the shear head as well as the economy of construction of the pivotal interconnection and the useful life of the component parts thereof. More particularly in this respect, the pivotal connection includes a pivot pin of uniform diameter which is axially slidably removable from either end of the joint assembly and which, in its assembled relationship with the relatively displaceable jaw members, is secured against rotation and axial displacement relative thereto. Securing the pivot pin against rotation and axial displacement advantageously minimizes frictional wear on the pin as well as non-uniform wear which would result if the pin were free to pivot about or slide along its axis. Preferably, the pivotal interconnection includes lubricated bearing sleeves and thrust bearing components which are field serviceable. With regard to maintenance in the field, one of the jaw members is adapted to be supported vertically, such as by a crane, to facilitate removal of the pivot pin and then separation of the latter jaw member from the other jaw member to facilitate access to and thus repair and/or replacement of the component parts of the pivotal connection.

It is accordingly an outstanding object of the present invention to provide improvements in a heavy duty shear attendant to the economical production thereof, efficiency in connection with the use and maintenance thereof, and increasing the life of the component parts thereof.

Another object is the provision of an improved support structure of welded metal sheet material for the shear head of a heavy duty shear and which provides a light weight support structure having the necessary structural integrity for mounting and supporting the shear head on the boom of a mobile machine.

Still another object is the provision of improvements in connection with the shear head of a heavy duty shear which provides for economical construction and maintenance thereof, improved efficiency in connection with the use and maintenance thereof, and improved structural integrity and expected life with respect to certain of the component parts thereof.

Yet a further object is an improvement in connection with the shearing blade insert components of a shear head having relatively pivotal jaw members carrying the shearing blade inserts and which provides for the universal interchangeability of the blade inserts enabling optimum use of the cutting edges thereof.

Yet another object is the provision of an improved pivotal interconnection between the relatively pivotal jaw members of a shear head which is economical to construct and maintain, which optimizes the useful life of the component parts thereof, and which facilitates the disassembly thereof in the field for maintenance and/or replacement of the component parts thereof.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawings in which.

DESCRIPTION OF PREFERRED EMBODIMENTS

Figure 1:
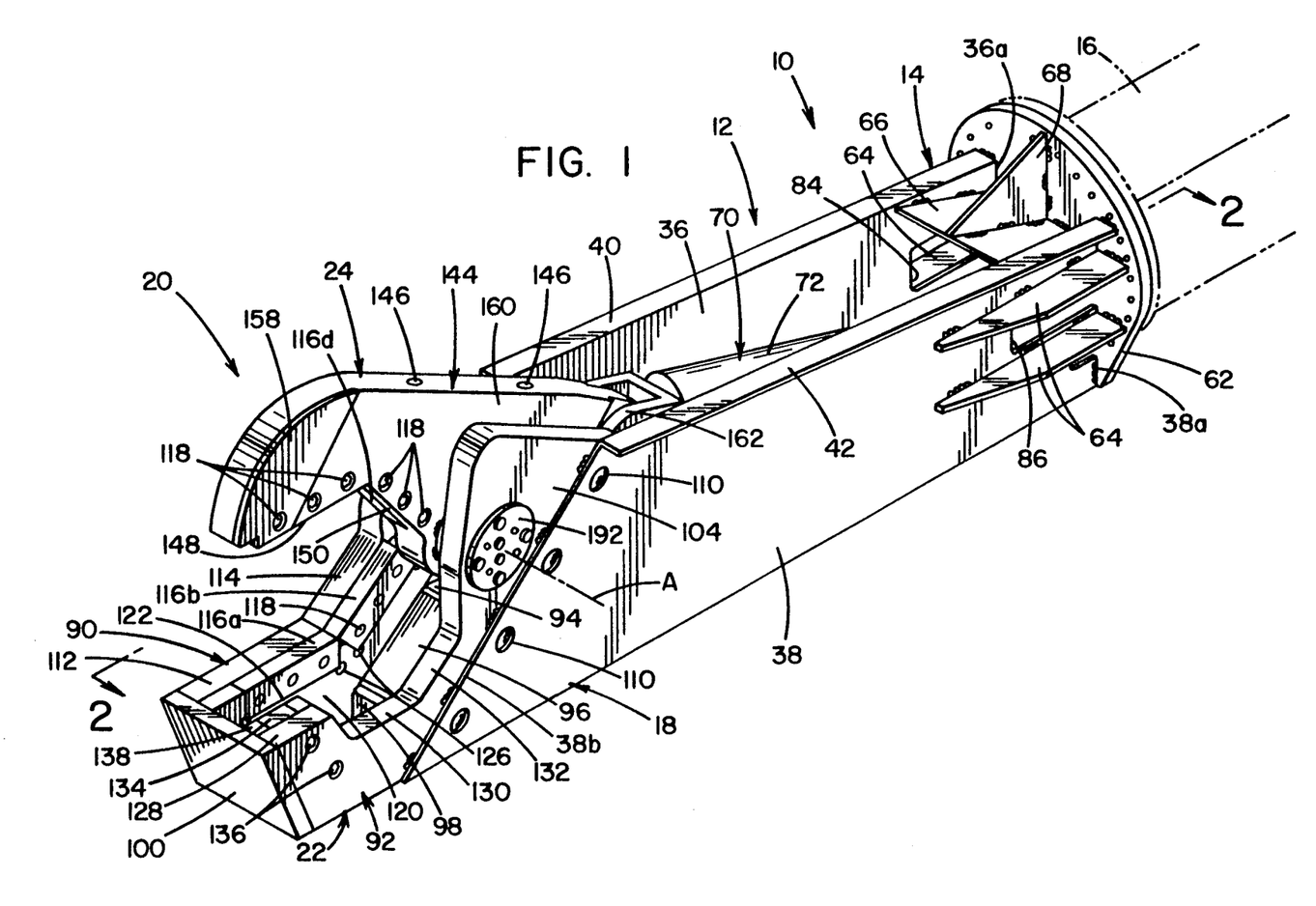
FIG. 1 is a perspective view of a heavy duty shear in accordance with the present invention.
Figure 2:
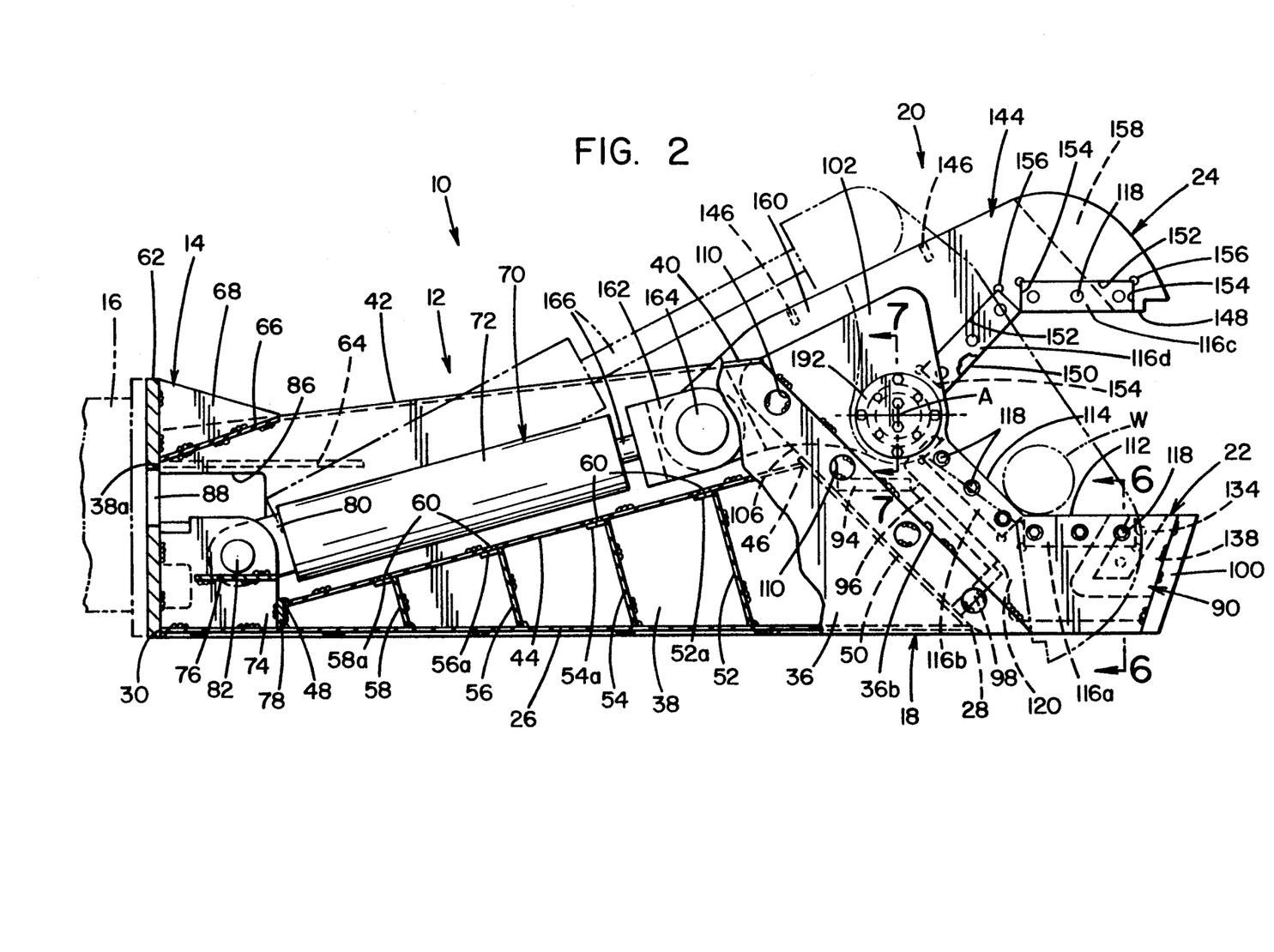
FIG. 2 is an elevation view of the shear, partially in section, taken along line 2—2 in FIG. 1.
Figures 3, 5:
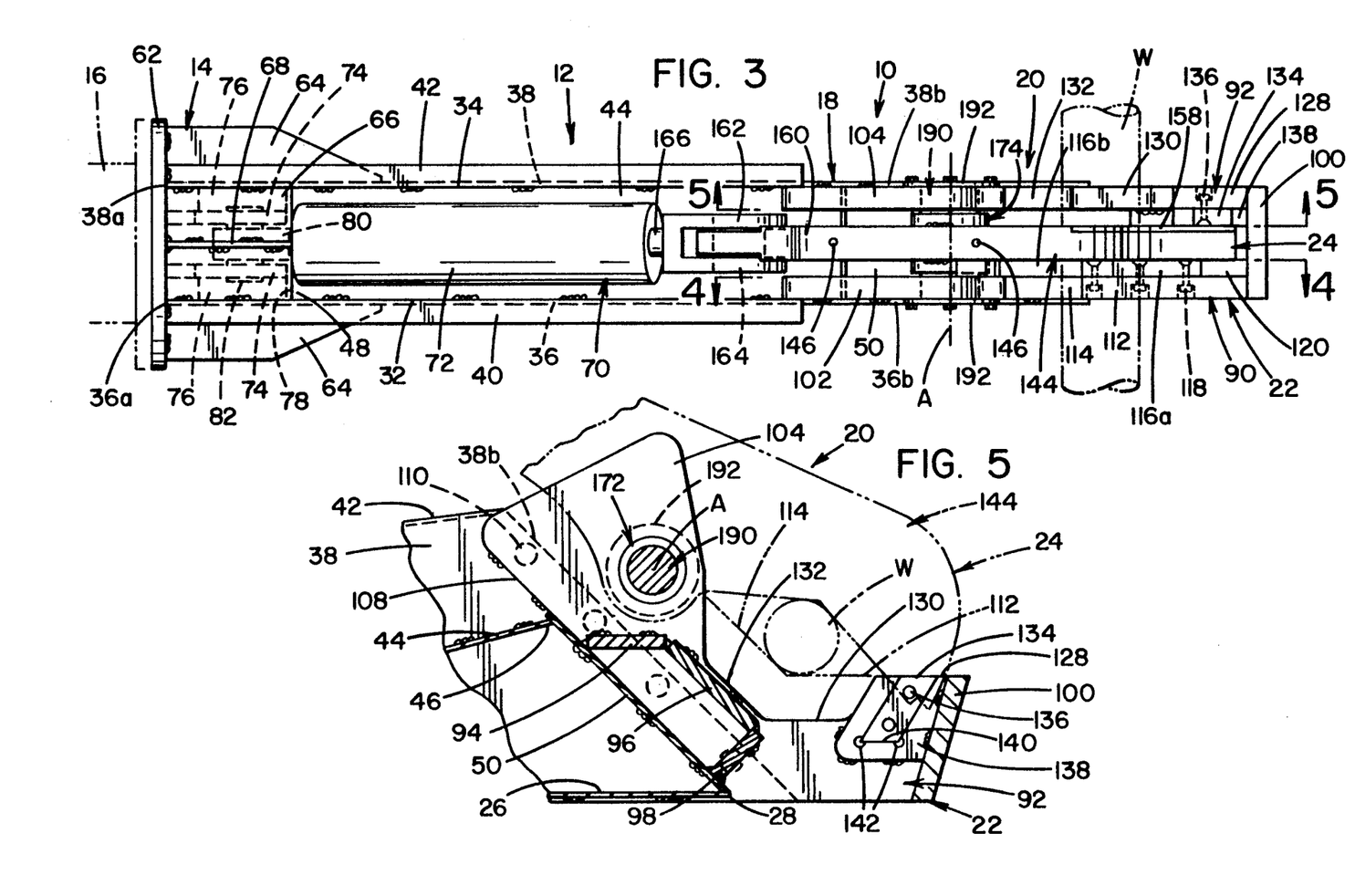
FIG. 3 is a plan view of the shear.
FIG. 5 is a sectional elevation view through the shear head taken along line 5—5 in FIG. 3.

Referring now in greater detail to the drawings, wherein the showings are for the purpose of illustrating preferred embodiments of the invention and not for the purpose of limiting the invention, FIGS. 1-3 illustrate a heavy duty shear 10 comprised of a support 12 having a rear end 14 for attaching the shear to the boom 16 of a mobile machine, such as a backhoe, not shown. Support 12 has a front end 18 to which is mounted a shear head 20 which, in the embodiment illustrated, includes a fixed lower jaw 22 and an upper jaw 24 supported for pivotal displacement toward and away from the lower jaw about a jaw axis A.

Support 12 is of welded sheet metal construction, preferably sheet steel, and includes a bottom plate 26 having a front and edge 28, a rear end edge 30 and laterally spaced apart side edges 32 and 34 between the end edges. Support 12 further includes a first side plate 36 welded to bottom plate 26 along side edge 32 thereof, and a second side plate 38 welded to bottom plate 26 along side edge 34 thereof. Side plates 36 and 38 extend vertically upwardly from bottom plate 26 and terminate in outwardly extending, inclined flanges 40 and 42, respectively, which provide the side plates with upper edges and which rigidify the corresponding side plate against flexure. Preferably, flanges 40 and 42 are integral with the corresponding side plate, although the flanges could be separate strips welded to the side plates along the upper edges thereof. Side plates 36 and 38 have corresponding rear ends including rear end edges 36a and 38a, respectively, which extend vertically from the lower to the upper edges of the side plates. Side plates 36 and 38 further have corresponding front ends including inclined front end edges 36b and 38b, respectively, which incline upwardly and rearwardly from the bottom edge to the top edge of the corresponding side plate.

As best seen in FIGS. 2 and 3, support 12 further includes an upper plate 44 intermediate bottom plate 26 and the upper edges of side plates 36 and 38. Plate 44 has front and rear edges 46 and 48, respectively, diverges relative to bottom plate 26 in the direction from rear edge 48 toward front edge 46, and extends between and is welded to side plates 36 and 38. A front cross plate 50 extends between and is welded to side plates 36 and 38 and to front end edges 28 and 46 of bottom plate 26 and upper plate 44, respectively. Plate 50 is inclined upwardly and rearwardly and is parallel to front end edges 36b and 38b of side plates 36 and 38, thus providing a recessed area rearwardly of front end edges 36b and 38b for the purpose which will become apparent hereinafter. A plurality of cross plates 52, 54, 56 and 58 are provided between bottom plate 26 and upper plate 44 in spaced apart relationship between the front and rear edges of the upper plate and, as will be appreciated from FIG. 2, each of the plates 52, 54, 56 and 58 extends between and is welded to side plates 36 and 38 and to bottom plate 26 and upper plate 44. Each of the cross plates is perpendicular to upper plate 44 and, thus, inclined relative to bottom plate 26 and, to facilitate welding the cross plates to upper plate 44, the cross plates have corresponding flanges 52a, 54a, 56a and 58a at their upper end and underlying openings 60 through upper plate 44. Peripheral portions of openings 60 and the adjacent sides of the underlying flanges are welded to secure the cross plates to upper plate 44.

A mounting plate 62 is welded to the rear end edges of bottom plate 26 and side plates 36 and 38 for mounting the shear to boom 16. In many applications, a rotator will be interposed between the mounting plate 62 and the boom 16. Such rotators and attachment are conventional and commercially available. Mounting plate 62 has a horseshoe like outer periphery providing portions extending laterally outwardly of each of the side plates 36 and 38 and upwardly from the upper edges of the side plates at the rear end edges thereof. Support 12 is rigidified at rear end 14 thereof by pairs of parallel vertically spaced apart reinforcing plates 64 extending forwardly from mounting plate 62 along the outer sides of side walls 36 and 38 and which are welded to the side walls and to mounting plate 62. Rear end 14 of the support is further rigidified by a cross plate 66 extending forwardly and upwardly from mounting plates 62 between side plates 36 and 38, and a vertical stiffner plate 68 extending forwardly from mounting plate 62 at a location centrally between side plates 36 and 38. Plate 66 is welded to the side plates and to reinforcing plate 62, and stiffner plate 68 is welded to cross plate 66 and to mounting plate 62.

The space between side walls 36 and 38 above upper plate 44 accommodate a hydraulic piston and cylinder unit 70 by which the upper jaw 24 of shear head 20 is pivoted relative to lower jaw 22, as set forth more fully hereinafter, and the rear end of the cylinder component 72 of the piston and cylinder unit is pivotally mounted on support 12 adjacent rear end 14 thereof. More particularly in this respect, support 12 is provided adjacent the juncture between bottom plate 26 and mounting plates 62 with a pair of laterally spaced apart support blocks 74 each of which, as will be appreciated from FIG. 2, is welded to bottom plate 26 and to mounting plate 62. Further, each of the support blocks 74 is secured to the adjacent one of the side walls 36 and 38 by a laterally extending plate 76 welded therebetween and by a plate 78 extending laterally across bottom plate 26 between side walls 36 and 38 and across the front ends of support blocks 74 and the rear edge 48 of upper plate 44. Cross plate 78 is welded to bottom plate 26, upper plate 44, side plates 36 and 38 and support blocks 74. The rear end of cylinder 72 of piston and cylinder unit 70 includes a mounting arm 80 which is received between support blocks 74 and which is pivotally interconnected therewith by means of a pivot pin 82. It will be appreciated that the mounted end of the piston and cylinder unit is accessible, such as for maintenance purposes, through the open upper end of support 12 and, to further facilitate access to the mounted end of the piston and cylinder unit, side plates 36 and 38 are provided adjacent the rear ends thereof with openings 84 and 86, respectively, and mounting plate 62 is provided with an opening 88 which, additionally, facilitates connecting piston and cylinder unit 70 to the hydraulic system of the mobile machine on which shear 10 is mounted.

As mentioned and described hereinabove, support 12 is of welded metal plate construction and, preferably, is constructed from steel plate. Such construction advantageously enables the support be fabricated by flame cutting the steel sheet material and assembling and welding the component parts which are designed and sized to provide the necessary structural integrity for the support during use of the shear while reducing the weight and cost of the unit relative to one of similar size and strength requirements constructed primarily of cast metal. In the embodiment illustrated, the foregoing advantages are obtained with a construction in which metal plates 26, 36, 38, 44, 50 and 66 are steel plates having a thickness of about 13 millimeters, or 0.5 inch, plates 52, 54, 56 and 58 are 9.5 millimeters, or 0.375 inch, and plates 64, 68, 76 and 78 are steel plates having a thickness of about 26 millimeters, or about 1 inch. Mounting plate 62 is a steel plate having a thickness of about 52 millimeters, or about 2 inches.

Referring now to FIGS. 1-5 of the drawing, shear head 20 of shear 10 is constructed from metal plate material, preferably steel plate, and, as mentioned hereinabove, includes lower and upper jaw 22 and 24, respectively, pivotally interconnected for upper jaw 24 to pivot relative to lower jaw 22 about axis A. Lower jaw 22 is comprised of first and second lower jaw plates 90 and 92, respectively, which are laterally spaced apart and interconnected at their inner ends by cross plates 94, 96 and 98 and at their outer ends by cross plate 100. Cross plates 94, 96 and 98 are welded to one another at the junctures therebetween and to each of the jaw plates 90 and 92, and cross plate 100 is welded to each of the lower jaw plates. Jaw plates 90 and 92 have upper end portions 102 and 104, respectively, and upper jaw 24 is received between portions 102 and 104 of the lower jaw plates and is pivotally interconnected therewith as described in greater detail hereinafter. Lower jaw plates 90 and 92 have inner end portions received between adjacent side plates 36 and 38 of support 12 and have inclined rear edges 106 and 108, respectively, parallel to the front edges 36b and 38b of the side plates and abutting the corresponding side portion of cross plate 50 of support 12. Lower jaw plates 90 and 92, and thus shear head 20, are secured to support 12 by welding. For this purpose, each of the side plates 36 and 38 is provided adjacent the corresponding front end edge with a plurality of openings 110 exposing the underlying lower jaw plate, and the jaw plate and side plate are joined by welding about the periphery of each opening. Further, the side plate and lower jaw plates are welded along front end edges 36b and 38b of the side plates and along the junctures between cross plates 94 and 98 of lower jaw 22 and cross plate 50 of support 12, and between the inner sides of side plates 36 and 38 and the upper end portions of rear edges 106 and 108 of lower jaw plates 90 and 92.

Figure 4:
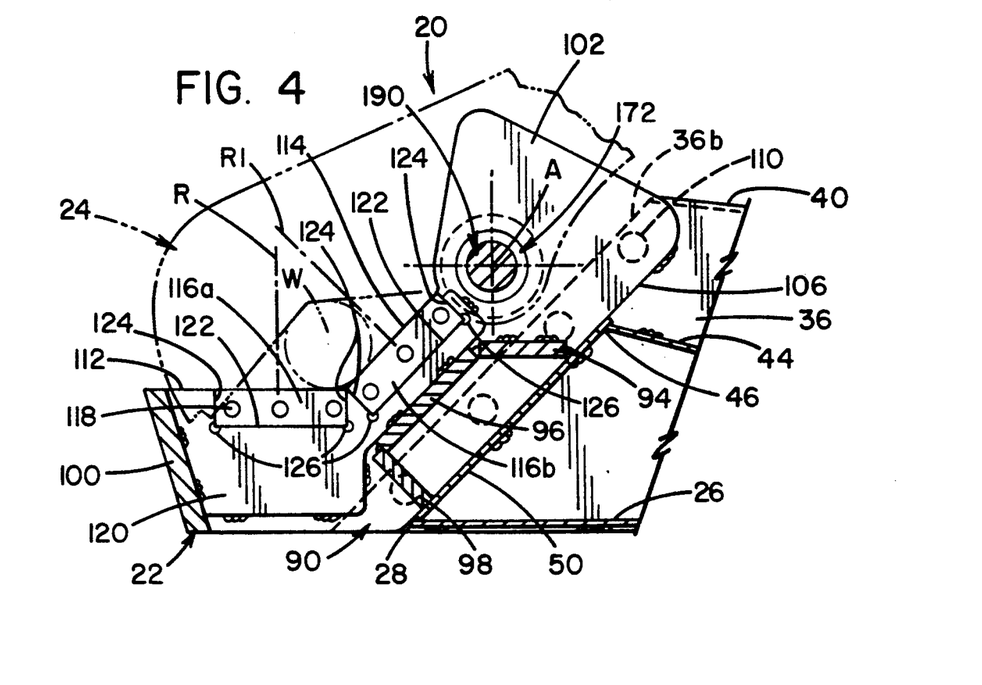
FIG. 4 is a sectional elevation view through the shear head of the shear taken along line 4—4 in FIG. 3.

As best seen in FIGS. 1 and 4, lower jaw plate 90 has upper obliquely related jaw surfaces 112 and 114, and a pair of shearing blade inserts 116a and 116b to be described in greater detail hereinafter, are removably mounted on the laterally inner side of jaw plate 90 parallel to jaw surfaces 112 and 114, respectively. Each of the inserts is removably mounted on the jaw plate by fasteners such as machine screw and nut assemblies 118 extending through openings therefor from the laterally inner side of the inserts and then through corresponding openings in the jaw plates. In accordance with the present invention, lower jaw 22 further includes an insert support plate 120 welded to the laterally inner side of lower jaw plate 90 and to cross plates 96 and 100. Support plate 120 is provided with a pair of recesses each receiving one of the inserts 116a and 116b, and has a lateral width corresponding to the width of inserts. Each of the recesses in plate 120 has a bottom wall 122 parallel to the corresponding one of the jaw surfaces 112 and 114, and opposite end walls 124 at right angles to the corresponding bottom walls. Inserts 116a and 116b and thus support plate 120 have considerable stress imposed thereon during operation of the shear and, to optimize the structural integrity of the support plate, stress relief openings 126 are provided therethrough at the corners between recess walls 122 and 124.

As best seen in FIG. 5, lower jaw plate 92 has an upper surface portion 128 generally coplanar with surface portion 112 of jaw plate 90, and upper surface portions 130 and 132 which are spaced below and generally parallel to surface portions 112 and 114, respectively, of jaw plate 90. The spacing of surface portions 130 and 132 below surface portions 112 and 114 is sufficient to assure that a workpiece W is completely severed prior to the workpiece engaging surface portions 130 and 132. The laterally inner side of jaw plate 92 is provided adjacent the front end and surface portion 128 thereof with a guide blade insert 134 which is removably secured to jaw plate 92 by a pair of machine screw and nut assemblies 136 extending laterally outwardly through openings therefor in insert 134 and corresponding openings in jaw plate 92. The guide blade extends laterally inwardly of the inner side of jaw plate 92 and, in accordance with the present invention, is supported by a guide blade support plate 138 which is welded to jaw plate 92 and cross plate 100. Support plate 138 is provided with a recess 140 corresponding to the contour of blade insert 134, and the support plate is provided adjacent the lower corners of recess 140 with stress relief openings 142. Guide plate insert 134 serves the purpose set forth hereinafter.

As best seen in FIGS. 1-3, upper jaw 24 includes an upper jaw plate 144, preferably a steel plate, having an upper surface provided with a pair of threaded openings 146 for the purpose set forth hereinafter. Plate 144 has laterally opposite sides respectively facing lower jaw plate 90 and lower jaw plate 92, and obliquely relate lower surfaces 148 and 150. The side of upper jaw plate 144 facing lower jaw plate 90 is provided with obliquely related recesses, each of which includes a bottom wall 152 parallel to the corresponding one of the surfaces 148 and 150 and end walls 154 perpendicular thereto. The recesses receive shearing blade inserts 116c and 116d which are respectively parallel to surfaces 148 and 150, and the inserts are secured in the recesses by machine screw and nut assemblies 118 extending through openings therefor in the inserts and through corresponding openings in the jaw plate. Jaw plate 144 is provided with stress relief openings 156 at the corners between walls 152 and 154 of each of the recesses for blade inserts 116c and 116d. The angle between shearing blade inserts 116a and 116b on lower jaw plate 90 and the inserts 116c and 116d on upper jaw plate 144 is the same, and end walls 124 and 154 of the lower and upper jaw plates nearest axis A are spaced the same distance from axis A, thus optimizing the cutting angles between the blade insert during a shearing operation. In this respect, it will be appreciated that the upper and lower shearing blade inserts cooperatively interengage with a workpiece W therebetween to sever the latter during pivotal displacement of upper jaw 24 downwardly about axis A and, as will be appreciated from FIG. 5, the exposed cutting edges of lower blade inserts 116a and 116b and the exposed cutting edges of upper blade inserts 116c and 116d are oriented relative to workpiece W to optimize the application of cutting force relative to axis A.

Figure 6:
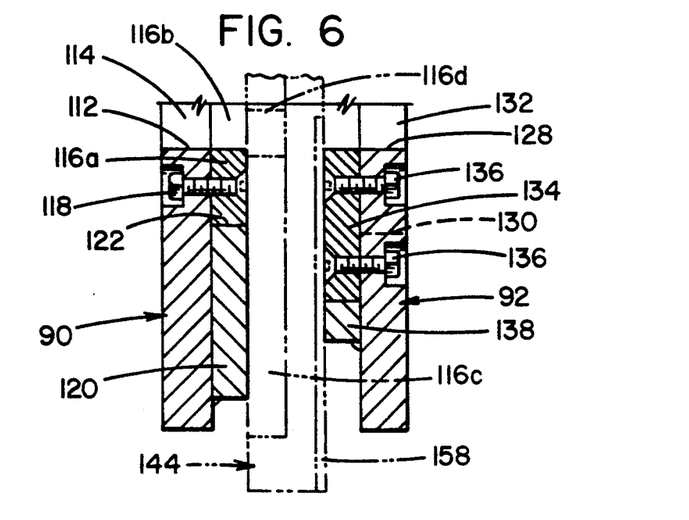
FIG. 6 is a sectional elevation view through the lower jaw member of the shear head taken along line 6—6 in FIG. 2.

The side of upper jaw plate 144 facing lower jaw plate 92 is recessed to receive a guide plate 158 having an outer surface which, as will be appreciated from FIGS. 3 and 6, is generally coplanar with the corresponding side of upper jaw plate 144 and with the laterally inner side of guide blade 134 on lower jaw plate 92. As is well known, when upper jaw 24 is displaced toward its closed position relative to lower jaw 22 to shear a workpiece therebetween, the guide plate 158, slidably interengages with guide blade 134 to restrain lateral displacement of upper jaw 24 in the direction toward lower jaw plate 92. As is further well known, the guide blade insert and guide plate are of hardened steel material to resist wear resulting from the sliding interengagement therebetween and the application of lateral force therebetween during such sliding engagement.

It is to be noted at this point that shearing blade inserts 116a, 116b, 116c and 116d are dimensionally identical. In this respect, they are of the same length, width and height, and the openings therethrough for fastener assemblies 118 as well as the openings for the latter in jaw plates 90 and 144 enable each of the inserts to be removably mounted in any one of the four recesses therefor and to be reversibly mounted in each of the recesses with respect to the opposite ends and with respect to the opposite side faces of the inserts. This dimensional identity promotes economy with respect to the manufacture of the inserts and with respect to maintenance of the shear in that it is only necessary to manufacture one blade insert structure and to maintain an inventory of one blade insert structure as opposed to two or more different blade structures. Additionally, the dimensional identity advantageously promotes a longer useful life for each of the individual shearing blade inserts by enabling the full length of each of the cutting edges thereof to be used before it becomes necessary to replace the inserts. When it is realized that the shearing blade inserts are subjected to considerable wear requiring relatively frequent replacement thereof, the ability to utilize the full length of each cutting edges of an insert can result in a considerable savings. The dimensional identity of the shearing blade inserts enables the latter to be achieved in the following manner. As will be appreciated from the positions of the upper and lower shearing blade inserts relative to a workpiece W in FIGS. 2 and 5, shearing of workpieces imposes the greatest amount of wear along portions of the cutting edges adjacent the junctures between the pairs of angularly related blade inserts, whereby the portions of the cutting edges adjacent the other ends of the inserts are relatively wear free. More particularly in this respect, with reference to FIG. 4 for example, the shearing of workpieces will impose considerable wear on the portion of the cutting edge of insert 116a to the right of an arbitrary reference line R and on the portion of the cutting edge of insert 116b to the left of another arbitrary reference line R1, whereas minimal wear is imposed on the portions of the cutting edges of the inserts to the left of reference line R and to the right of reference line R1. When the wear on the cutting edges dictates replacement thereof, the dimensional identity of the inserts 116a and 116b provides for the latter to be reversed relative to the position shown in FIG. 4 so that the unworn portions of the cutting edges of the two blade inserts are between the reference lines R and R1. Accordingly, the full length of the cutting edge of each insert becomes useful, thus extending the life of the insert. The reversal of the two inserts referred to above is not possible if the inserts are of different length, and there is no reorientation of a blade insert in its own recess which enables exposing the unworn portions of the four cutting edges thereof for shearing. The same reversible relationship applies to shearing blade inserts 116c and 116d on upper jaw plate 144. Moreover, the dimensional identity of the inserts in accordance with the present invention enables reorientation of lower inserts 116a and 116b into the recesses for upper inserts 116d and 116c, respectively, for the same purpose of exposing unworn edge portions of the lower blade inserts on the upper jaw member. It is to be noted here, that it is not possible to reorient lower blade insert 116b in the recess for upper blade insert 116d, or to reorient lower blade insert 116a in the recess for upper blade insert 116c for the purpose of exposing unworn edge portions of lower inserts 116a and 116b. Therefore, in order to obtain the full benefit of usability with respect to the entire length of each cutting edge of each blade insert in accordance with the present invention, it is necessary that all four blade inserts be dimensionally identical. In this respect, for example, if the upper blade insert corresponding to blade insert 116c in the embodiment disclosed were shorter in length than lower blade insert 116b and the upper blade insert 116d were of the same length as insert 116b, the upper blade inserts could not be reoriented relative to one another or relative to the lower inserts to obtain the full cutting edge wear capability according to the invention, and the only interchangeability in this respect would reside in the lower blade inserts. The end result would be that more than one blade insert structure would be required and that only the lower blades be used to their full capability with respect to the cutting edges thereof.

As best seen in FIGS. 1-3, upper jaw plate 144 has an inner end 160 pivotally interconnected with the piston and cylinder unit 70 by means of a yoke 162 receiving jaw plate portion 160 therebetween and a pivot pin 164 interconnecting plate portion 160 and yoke 162. Yoke 162 is attached to the outer end of piston rod 166 of piston and cylinder assembly 70, whereby extension of piston rod 166 to the right in FIG. 2 pivots upper jaw 24 clockwise about axis A to the closed position thereof relative to lower jaw 22 as shown by the broken line position of upper jaw in the latter figure. Retraction of piston rod 166 returns the upper jaw to its open or solid line position shown in FIG. 2. While not shown, it will be appreciated that cylinder 72 of piston and cylinder unit 70 is connected to the hydraulic system of the mobile machine on which the shear is oriented and that fluid flow to and from the cylinder is appropriately controlled to achieve the foregoing closing and opening movements of upper jaw 24.

As mentioned hereinabove, the component parts of shear head 20 are preferably of steel plate material and, in the embodiment disclosed, lower jaw plates 90 and 92 have a thickness of about 89 millimeters or about 3.5 inches, and the shearing blade insert support plate 120 and guide plate insert support plate 138 are each about 63 millimeters or about 2.5 inches thick. Accordingly, it will be appreciated that the shearing blade inserts and guide plate insert are of the same thickness. Upper jaw plate 144 has a thickness of about 127 millimeters or about 5.0 inches, and guide plate 158 has a thickness of about 13 millimeters or 0.5 inch.

Figure 7:
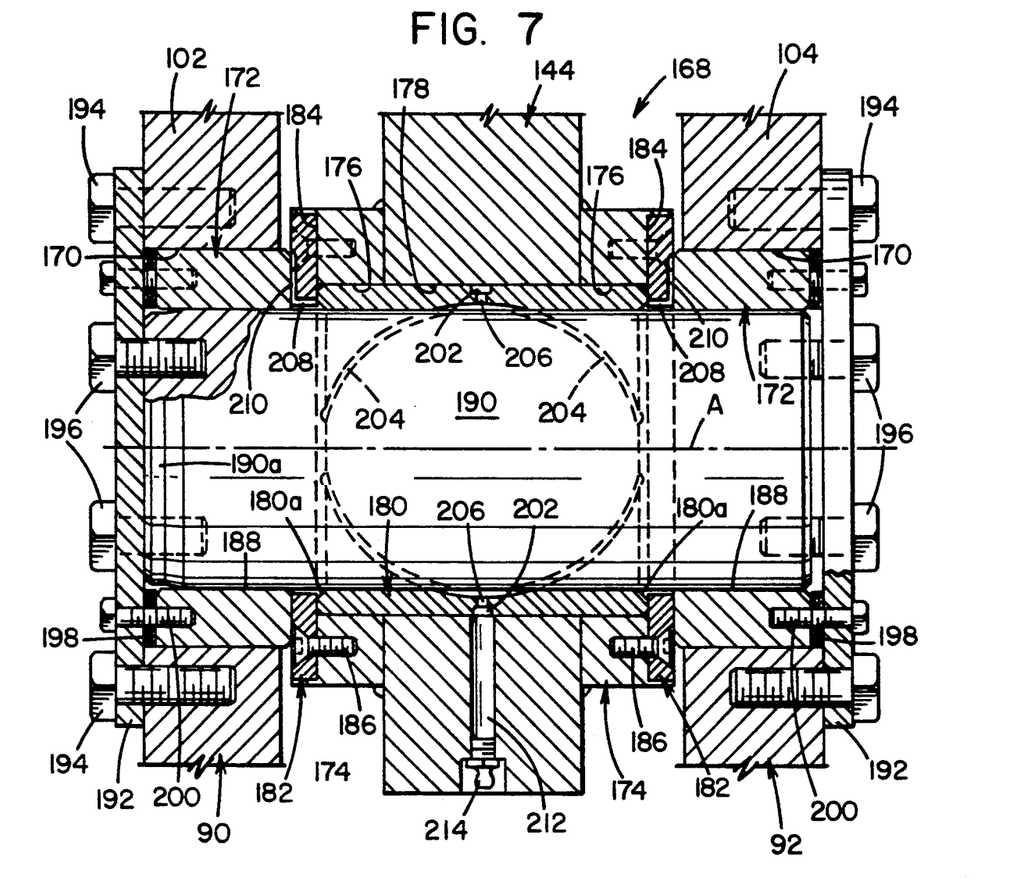
FIG. 7 is a sectional elevation view showing the pivotal interconnection between the jaw members of the shear head taken along line 7—7 in FIG. 2.
Figure 8:
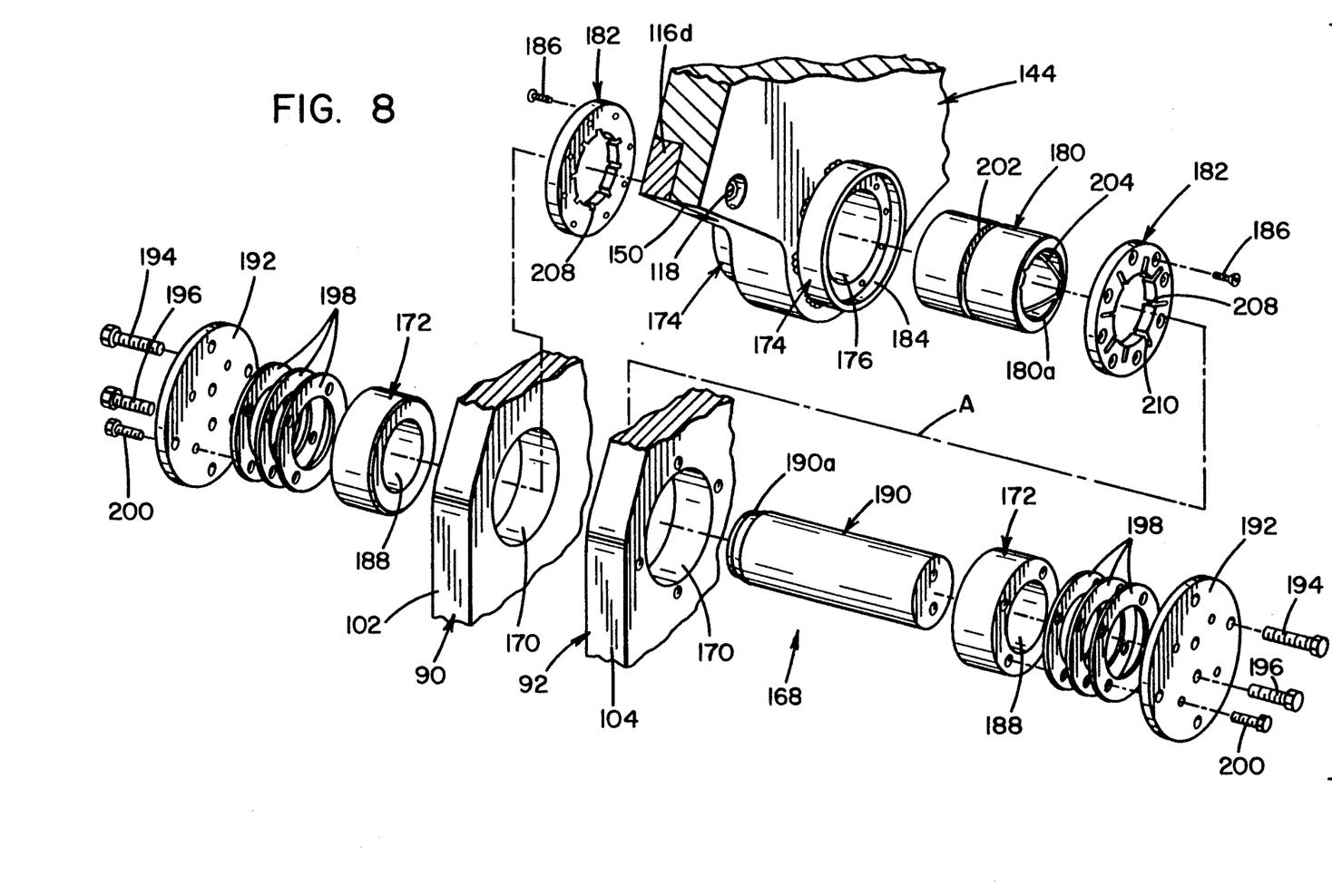
FIG. 8 is an exploded perspective view of the pivotal interconnection between the jaw members of the shear head; and, FIG. 9 is a schematic elevation view showing the relative positions between the cutting blade inserts on the upper and lower jaw members of the shear head during a shearing operation.

As best seen in FIGS. 7 and 8 of the drawing, upper jaw 24 is mounted on lower jaw 22 for pivotal displacement about axis A by a pivot pin assembly 168. More particularly, upper portions 102 and 104 of lower jaw plates 90 and 92 are each provided with a bore 170 removably receiving a corresponding steel bushing 172 which is slidably received therein, and the laterally opposite sides of upper jaw plate 144 received between plate portions 102 and 104 are each provided with a steel collar 174 which is welded to the corresponding side of plate 144. Each of the collars 174 has a bore 176 therethrough and upper jaw plate 144 is provided with a bore 178 corresponding in diameter to bores 176. A bronze bearing sleeve 180 is press fit in bores 176 and 178 and is axially retained in position relative to upper jaw plate 144 by bronze retaining and thrust bearing washers 182 mounted on the axial outer end of each of the collars 174. More particularly in this respect, each of the collars 174 is provided with a recess 184 for the corresponding washer 182, and the washers are removably mounted on collars 174 in recesses 184 by corresponding threaded fasteners 186 extending into threaded openings therefore in collars 174.

Bushings 172 have corresponding bores 188 closely corresponding to the inner diameter of bearing sleeve 180, and a pivot pin 190 of generally uniform diameter between its opposite ends is slidably received in bearing sleeve 180 and in bores 188 of bushings 172. Pivot pin 190 is axially retained in a fixed position relative to lower jaw plate portions 102 and 104 by steel cap plates 192 removably mounted on the axially outer sides of plates 102 and 104 by a plurality of bolts 194 and, further, by means of a plurality of bolts 196 at each of the axially opposite ends of pin 190 and which extend through the corresponding cap plate and into corresponding threaded openings therefor in the ends of the pin. A plurality of steel shim rings 198 are disposed between the axially outer ends of bushings 172 and the axially inner side of the corresponding cap plate 192 and are secured in place relative thereto by means of a plurality of threaded fasteners 200. The number and thickness of shim rings 198 provides for controlling the positions of the axially inner faces of bushings 172 relative to the axially outer faces of thrust bearing washers 182, thus to provide the desired thrust bearing function for the latter with optimum frictional engagement thereof with the bushings.

Preferably, the outer periphery of sleeve bearing 180 is provided with a circumferentially continuous lubricating groove 202 intermediate the opposite ends thereof and the inner periphery of the bearing sleeve is provided with lubricating grooves 204 communicating with groove 202 through radial passages 206. Grooves 204 extend spirally from radial passages 206 to the axially opposite ends of the bearing sleeve where they intersect a chamfered edge 180a at the corresponding end of sleeve 180. The inner diameters thrust bearing washer 182 is slightly larger than the diameter of pivot pin 190, and the inner periphery of each of the thrust washers is provided with a plurality of axially extending lubricant passages 208 each of which terminates in a radially extending passage 210 in the axially outer side of the washer facing the corresponding bushing 172. Upper jaw plate 144 is provided with a lubricant passageway 212 which communicates with groove 202 in the outer periphery of bearing sleeve 180, and a suitable lubricant such as grease is adapted to be introduced into passageway 212 and thus into the aforementioned lubricating grooves and passages in sleeve bearing 180 and thrust bearing washers 182 through a fitting 214 at the outer end of passageway 212.

The pivot pin assembly structured as described hereinabove advantageously provides a pivotal interconnection between the upper and lower jaws which minimizes wear on the component parts of the assembly by precluding relative axial and pivotal displacement between the pivot pin and the lower jaw plates. Moreover, by fixing each of the opposite ends of the pivot pin against rotational displacement, the imposition of torsional loads on the pivot pin during operation of the shear is minimized. Furthermore, the construction advantageously enables the component parts of the assembly to be readily disassembled in the field for repair and replacement purposes. More particularly in this respect, eye-bolts are adapted to be threaded into openings 146 in the top edge of upper jaw plate 144 so that the weight of the latter can be vertically supported such as by a crane or the like. When so supported, removal of pivot pin 190 is readily achieved by removing the cap plates 192 and axially the pin out of the openings therefore through bearing sleeve 180 and bushings 172. Once pin 190 is removed, upper jaw plate 144 can be elevated from between lower jaw portions 102 and 104, whereby the component parts of the assembly are readily assembled for inspection and maintenance and/or replacement purposes. Reassembly is achieved, similarly, by supporting upper jaw plate 144 in its position between lower jaw plate portions 102 and 104, reinserting pivot pin 190, and remounting end cap plates 192. Preferably, to facilitate insertion of pin 190 through the openings therefor in bearing sleeve 180 and bushings 188, one end of pin 190 is circumferentially and radially relieved as indicated by the numeral 190a in FIGS. 7 and 8.

It is believed that the operation of the shear will be obvious and understood from the foregoing description. Briefly in this respect, a workpiece W to be sheared is initially positioned on lower jaw 22 with upper jaw 24 in the open position shown by the solid line position thereof in FIG. 2. The upper jaw is then pivoted about axis A by hydraulic piston and cylinder unit 70 towards the closed position thereof and initially engages workpiece W when upper jaw plate 144 reaches the broken line position thereof shown in FIG. 5 of the drawing. At this time, as will be appreciated from FIG. 5, guide plate 158 on upper jaw plate 144 is in sliding engagement with guide blade 134 on lower jaw plate 92, workpiece W is captured between the lower and upper shearing blade inserts, and the workpiece is spaced above upper edges 130 and 132 of lower jaw plate 92. Upon further displacement of upper jaw plate 144 clockwise about axis A from the position shown in FIG. 5, workpiece W is severed by the shearing blade inserts as upper jaw plate 144 moves to the closed position thereof shown by broken lines in FIG. 2.

Figure 9:
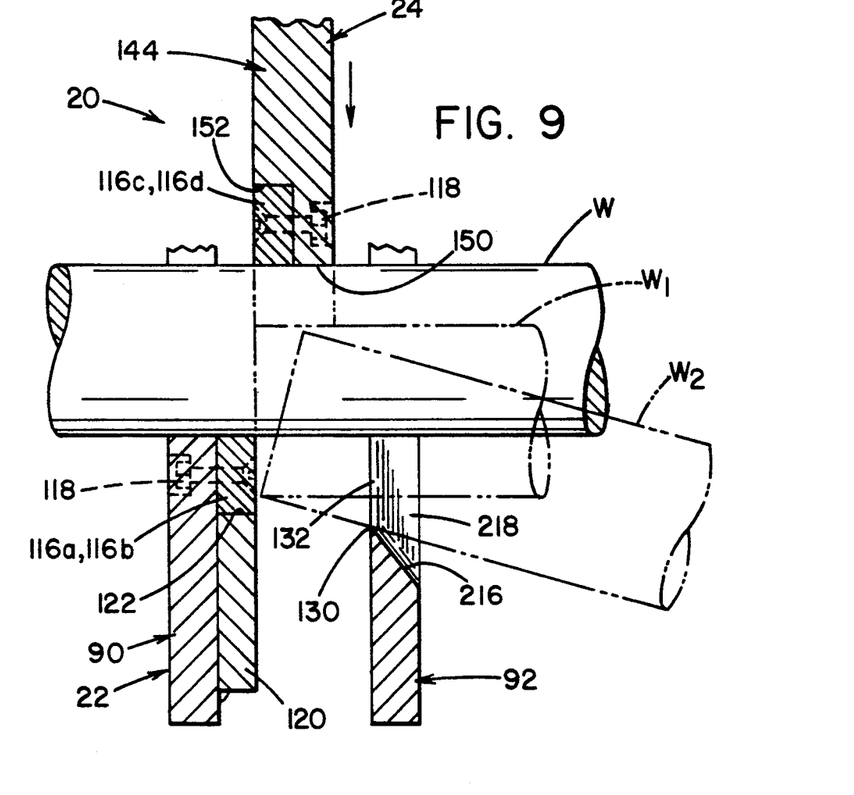

When shearing of the workpiece is completed, the portion of the workpiece overlying upper edges 130 and 132 of lower jaw plate 92 drops onto the latter and, preferably, is displaced by its own weight and momentum laterally outwardly of lower jaw plate 92 and thus off of upper surface portions 130 and 132 thereof. To promote such displacement of the sheared workpiece in accordance with another aspect of the present invention, and further preclude the likelihood of engagement between the workpiece and the non-cutting portions of the jaw plates, upper surface portions 130 and 132 of jaw plate 92 are provided with downwardly and laterally outwardly inclined surface portions 216 and 218, respectively, as shown in FIG. 9 of the drawing. The displacement of the sheared workpiece laterally outwardly from this side of the shear results from the incline of surface portions 216 and 218. Further, as shown in FIG. 9, during the initial shearing interengagement of shearing blade inserts with workpiece W, the upper shearing blades are displaced downwardly and workpiece W is displaced downwardly through the broken line position indicated $W_1$. As the upper shear blades continue to move downwardly, shearing progresses toward completion and the workpiece, towards the end of shearing or upon completion thereof, inclines downwardly under its own weight to the position indicated by $W_2$. In the latter position, it will be appreciated that the relief provided by inclined surface portions 216 and 218 improves the ability of the workpiece to incline relative to lower jaw plate 92 and thus move out of the path of the upper jaw plate as the latter moves to the fully closed position.

While considerable emphasis has been placed herein on the structures of the preferred embodiments and on the structural interrelationships between the component parts thereof, it will be appreciated that many embodiments of the invention can be made and that many change can be made in the embodiments herein illustrated and described without departing from the principles of the invention. In particular, it will be appreciated that support 12 can be associated with a shear head other than shear head 20, and vice versa. Further, with regard to the shear head, it will be appreciated that the pivot pin assembly between the upper and lower jaws can be used with jaw components other than those disclosed herein, and that the use of pairs of lower and upper shearing blade inserts of dimensional identity can be used with jaw structures other than the preferred structures disclosed herein. Accordingly, it is to be distinctly understood that the foregoing descriptive matter is to be interpreted merely as illustrative of the present invention and not as a limitation.

Having thus described the invention it is claimed:

1. In a heavy duty shear attachable to the boom of a mobile machine and comprising support means having opposite ends, means on one of said ends for attaching said support means to said boom, means providing relatively pivotal shearing means on the other of said ends, and means to relatively pivot said shearing means, the improvement comprising: said support means including bottom plate means having front and rear end edges and laterally spaced apart side edges between said end edges, side plate means having lower edges secured to said bottom plate means along said side edges thereof, said side plate means extending upwardly from said bottom plate means and having upper edges spaced above said bottom plate means, said side plate means having front and rear ends respectively including front and rear edges between said lower and upper edges, upper plate means between and secured to said side plate means above said bottom plate means, said upper plate means extending in the direction between said front and rear end edges of said side plate means, said upper plate means having front and rear edges, and a plurality of cross plates extending between and secured to said side plate means in spaced apart relationship between said front and rear edges of said upper plate means, said cross plates having upper and lower ends respectively secured to said upper plate means and said bottom plate means, and said means providing said shearing means being secured to said side plate means at said front ends thereof.

2. The improvement according to claim 1, wherein said front end edges of said bottom plate means and said upper plate means are spaced rearwardly from said front end edges of said side plate means, and said means providing said shearing means is secured to said side plate means in the space between said front edges thereof and said front edges of said bottom and upper plate means.

3. The improvement according to claim 2, wherein said plurality of cross plates includes a front cross plate between and secured to said side plate means and having upper and lower ends respectively at said front edges of said upper and bottom plate means.

4. The improvement according to claim 1, wherein said upper plate means diverges relative to said bottom plate means in the direction from the rear edges toward the front edges thereof, and said cross plates are inclined rearwardly relative to said bottom plate means.

5. The improvement according to claim 4, wherein said front edges of said side plate means incline rearwardly relative to said bottom plate means and said cross plates include a front cross plate between and secured to said side plate means parallel to and spaced rearwardly from said front edges of said side plate means, said means providing shearing means being between and secured to said side plate means in the areas thereof between said front edges thereof and said front cross plate.

6. The improvement according to claim 5, wherein said areas of said side plate means are apertured to expose said means providing shearing means for welding.

7. The improvement according to claim 5, wherein said means for attaching said support means to said boom includes mounting plate means secured to said rear edges of said side and bottom plate means, said mounting plate means including portions extending laterally outwardly of said side plate means, and reinforcing plate means extending laterally outwardly from and secured to said side plate means and to said portions of said mounting plate means.

8. The improvement according to claim 7, wherein said support means further includes a rear cross plate between and secured to said side plate means and extending forwardly from said rear edges thereof, and a stiffner plate secured to and extending vertically from said rear cross plate, said rear cross plate and stiffner plate being secured to said mounting plate.

9. The improvement according to claim 1, wherein said means for attaching said support means to said boom includes mounting plate means secured to said rear edges of said side and bottom plate means, said mounting plate means including portions extending laterally outwardly of said side plate means, and reinforcing plate means extending laterally outwardly from and secured to said side plate means and to said portions of said mounting plate means.

10. The improvement according to claim 9, wherein said support means further includes a rear cross plate between and secured to said side plate means and extending forwardly from said rear edges thereof, and a stiffner plate secured to and extending vertically from said rear cross plate, said rear cross plate and stiffner plate being secured to said mounting plate.

11. The improvement according to claim 1, wherein said upper plate means is spaced below said upper edges of said side plate means and diverges relative to said bottom plate means in the direction from the rear edges toward the front edges thereof, said means to relatively pivot said shearing means being mounted between said side plate means and above said upper plate means.

12. The improvement according to claim 1, wherein said means providing relatively pivotal shearing means includes fixed lower jaw means, upper jaw means, means supporting said upper jaw means for pivotal displacement between open and closed positions relative to said lower jaw means, and blade means on said upper and lower jaw means cooperable to shear a workpiece therebetween during displacement of said upper jaw means from said open toward said closed position.

13. The improvement according to claim 12, wherein said blade means includes first and second pairs of shearing blade members detachably mounted respectively on said lower and upper jaw means, the blade members of each pair being oblique to one another, and all four of said blade members being dimensionally identical.

14. The improvement according to claim 12, wherein said side plate means of said support means includes first and second side plates, said lower jaw means includes a first lower jaw plate adjacent said first side plate and a second lower jaw plate adjacent said second side plate, said first and second lower jaw plates having laterally spaced apart inner surfaces, said blade means on said lower jaw means including shearing blade member means detachably mounted on said inner surface of said first lower jaw plate, said shearing blade member means extending laterally inwardly of said inner surface, and shearing blade support plate means separate from said first lower jaw plate and secured to said inner surface thereof to support said shearing blade member means.

15. The improvement according to claim 14, and guide blade member means detachably mounted on said inner surface of said second lower jaw plate and extending laterally inwardly thereof, and guide blade support plate means separate from said second lower jaw plate and secured to said inner surface thereof to support said guide blade member means.

16. The improvement according to claim 14, wherein said shearing blade member means includes a pair of shearing blade members having opposite ends and corresponding bottom surfaces, said blade members being detachably mounted on said inner surface of said first lower jaw plate in end to end relationship and with said bottom surfaces at an angle to one another, and said blade support plate means being a plate member having a recess for each blade member, said recesses having ends engaging the opposite ends of the corresponding blade member and bottoms at said angle to one another.

17. The improvement according to claim 14, wherein said upper jaw means includes an upper jaw plate pivotally mounted between said first and second lower jaw plates, said upper jaw plate having laterally opposite first and second sides respectively facing the inner surfaces of said first and second lower jaw plates, said blade means on said upper jaw means including shearing blade member means detachably mounted on said first side of said upper jaw plate.

18. The improvement according to claim 17, wherein said shearing blade member means on said first lower jaw plate is a first pair of shearing blade members and said shearing blade member means on said upper jaw plate is a second pair of shearing blade members, all four of said shearing blade members being dimensionally identical.

19. The improvement according to claim 18, and guide blade member means detachably mounted on said inner surface of said second lower jaw plate and extending laterally inwardly thereof, and guide blade support plate means separate from said second lower jaw plate and secured to said inner surface thereof to support said guide blade member means, and guide plate means on said second side of said upper jaw plate for slidably engaging said guide blade member means on said second lower jaw plate during displacement of said upper jaw means from said open toward said closed position.

20. The improvement according to claim 19, wherein said front end edges of said bottom plate means and upper plate means of said support means are spaced rearwardly from said front end edges of said side plate means, said first and second lower jaw plates being secured to said side plate means in the spaces between said front end edges thereof and said front end edges of said bottom and upper plates, said upper plate means being spaced below said upper edges of said side plate means and diverging relative to said bottom plate means in the direction from the rear edges toward the front edges thereof, said means to relatively pivot said shearing means being mounted between said side plate means and above said upper plate means, and including piston and cylinder means having opposite ends connected one to said support means adjacent said one end and the other to said upper jaw plate.

21. The improvement according to claim 12, wherein said lower jaw means includes laterally spaced apart first and second lower jaw member means having outer and inner ends, said blade means on said lower jaw means being on said first lower jaw member means and providing cutting edge means extending in the direction between said outer and inner ends, said second lower jaw member means having upper edge means generally parallel to and spaced below said cutting edge means and inclined surface means extending downwardly and laterally outwardly from said upper edge means.

22. In a heavy duty shear head attachable to the boom of a mobile machine and comprising relatively pivotal shearing means including lower jaw means, upper jaw means, means supporting said upper and lower jaw means for relative pivotal displacement between open and closed positions, and blade means on said upper and lower jaw means cooperable to shear a workpiece therebetween during relative displacement of said upper and lower jaw means from said open toward said closed position, and means to relatively pivot said jaw means, the improvement comprising: said blade means including first and second pairs of shearing blade members detachably mounted respectively on said lower and upper jaw means, the blade members of each pair being oblique to one another, and all four of said blade members being dimensionally identical.

23. The improvement according to claim 22, wherein said lower jaw means includes a first lower jaw plate and a second lower jaw plate, said first and second lower jaw plates having laterally spaced apart inner surfaces, said first pair of shearing blade members being detachably mounted on and extending laterally inwardly of said inner surface of said first lower jaw plate, and shearing blade support plate means separate from said first lower jaw plate and secured to said inner surface thereof, said shearing blade support plate means having recess means receiving and supporting said first pair of shearing blade members.

24. The improvement according to claim 23, wherein said recess means include adjacent walls at an angle to one another, and stress relief openings in said shearing blade support plate means between said adjacent walls.

25. The improvement according to claim 23, and a guide blade member detachably mounted on said inner surface of said second lower jaw plate and extending laterally inwardly thereof, and guide blade support plate means separate from said second lower jaw plate and secured to said inner surface thereof, said guide blade support plate means including a recess receiving and supporting said guide blade member.

26. The improvement according to claim 23, wherein said first pair of shearing blade members are rectangular and have opposite ends and corresponding top and bottom surfaces, said shearing blade support plate means being a plate member and said recess means including a recess in said plate member for each blade member, each said recess having ends engaging the opposite ends of the corresponding blade member and a bottom engaging the bottom surface of the corresponding blade member.

27. The improvement according to claim 23, wherein said upper jaw means includes an upper jaw plate pivotally mounted between said first and second lower jaw plates, said upper jaw plate having laterally opposite first and second sides respectively facing the inner surfaces of said first and second lower jaw plates, said second pair of shearing blade members being detachably mounted in corresponding recesses on said first side of said upper jaw plate.

28. The improvement according to claim 27, and a guide blade member detachably mounted on said inner surface of said second lower jaw plate and extending laterally inwardly thereof, and a guide blade support plate member separate from said second lower jaw plate and secured to said inner surface thereof, said guide blade support plate member including a recess receiving and supporting said guide blade member.

29. The improvement according to claim 28, and a guide plate on said second side of said upper jaw plate for sliding engagement with said guide blade member during displacement of said upper jaw means between said open and closed positions.

30. The improvement according to claim 29, wherein said first pair of shearing blade members are rectangular and have opposite ends and corresponding top and bottom surfaces, said shearing blade support plate means being a plate member and said recess means including a recess in said plate member for each blade member, each said recess having ends engaging the opposite ends of the corresponding blade member and a bottom engaging the bottom surface of the corresponding blade member.

31. The improvement according to claim 30, wherein each of said recesses in said shearing blade support plate member and in said guide blade support plate member and in said upper jaw plate has adjacent walls at an angle to one another, and stress relief openings in said support plate members and said upper jaw plate between said adjacent walls.

32. The improvement according to claim 22, wherein said lower jaw means includes laterally spaced apart first and second lower jaw plates having outer and inner ends, said first pair of shearing blade members being mounted on said first lower jaw plate and providing a cutting edge having oblique portions between said outer and inner end, said second lower jaw plate having upper edge means generally parallel to and spaced below said oblique portions of said cutting edge and inclined surface portions extending downwardly and laterally outwardly from said upper edge means.

33. In a heavy duty shear head attachable to the boom of a mobile machine and comprising relatively pivotal shearing means including lower jaw means, upper jaw means, means supporting said upper and lower jaw means for relative pivotal displacement between open and closed positions, blade means on said upper and lower jaw means cooperable to shear a workpiece therebetween during relative displacement of said upper and lower jaw means from said open toward said closed position, and means to relatively pivot said jaw means, the improvement comprising: said lower jaw means including laterally spaced apart first and second lower jaw member means having outer and inner ends, said blade means on said lower jaw means being on said first lower jaw member means and providing cutting edge means extending in the direction between said outer and inner ends, said second lower jaw member means having upper edge means generally parallel to and spaced below said cutting edge means and inclined surface means extending downwardly and laterally outwardly from said upper edge means.

34. In a heavy duty shear head attachable to the boom of a mobile machine and comprising relatively pivotal shearing means including first and second jaw means, means supporting said first and second jaw means for relative pivotal displacement between open and closed positions, blade means on said first and second jaw means cooperable to shear a workpiece therebetween during relative displacement of said first and second jaw means from said open toward said closed position, and means to relatively pivot said jaw means, the improvement comprising: said means supporting said first and second jaw means for relative pivotal displacement comprising parallel spaced apart first and second support means fixed relative to said first jaw means and receiving said second jaw means therebetween, means providing said first and second support means and said second jaw means therebetween with coaxial openings therethrough, a pivot pin received in said openings and having an axis coaxial therewith and first and second axially opposite ends respectively in the openings through said first and second support means, said second jaw means being pivotal relative to said pivot pin, first and second plate means releasably secured respectively to said first and second support means against rotation about said axis, and means releasably securing said first and second plate means respectively to said first and second ends of said pivot pin to preclude rotation of said pivot pin about said axis.

35. The improvement according to claim 34, wherein said pivot pin is of uniform diameter between said ends thereof.

36. The improvement according to claim 34, wherein said second jaw means includes means to support said second jaw means in the direction transverse to said axis to facilitate removal and insertion of said pivot pin relative to said openings.

37. The improvement according to claim 34, wherein said second jaw means has axially opposite sides between said first and second support means, said means providing said second jaw means with an opening therethrough including a bore between said opposite sides coaxial with said axis, an annular collar on each of said opposite sides and secured to said second jaw means coaxial with said bore, and bearing sleeve means received in said bore and said annular collars.

38. The improvement according to claim 37, and means to axially retain said bearing sleeve means in said bore and annular collars.

39. The improvement according to claim 38, wherein each said annular collar has an axially outer end, and said means to retain said bearing sleeve means includes an annular thrust bearing plate detachably secured to the outer end of each said annular collar.

40. The improvement according to claim 39, wherein said bearing sleeve and said thrust bearing plates have lubricant passageways in communication with one another, and said second jaw means includes passageway means for supplying lubricant to the lubricant passageways in said bearing sleeve means.

41. The improvement according to claim 39, wherein said means providing said first and second support means with openings therethrough includes first and second bores respectively through said first and second support means and coaxial with said axis, and first and second annular bushings respectively in said first and second bores, said first and second annular bushings having axially inner ends engaging with the annular thrust bearing plates on the axially outer ends of said annular collars.

42. The improvement according to claim 41, wherein said bearing sleeve and said thrust bearing plates have lubricant passageways in communication with one another, and said second jaw means includes passageway means for supplying lubricant to the lubricant passageways in said bearing sleeve means.

43. The improvement according to claim 41, wherein each said first and second support means has an axially outer side and said first and second plate means are releasably secured respectively to said outer side of said first and second support means.

44. The improvement according to claim 43, wherein said means releasably securing said first and second plate means to said ends of said pivot pin includes at least two threaded fasteners between each plate means and the corresponding end of said pivot pin.

45. The improvement according to claim 43, wherein said first and second annular bushings have axially outer ends respectively facing said first and second plate means, and means releasably securing said first and second bushings at said outer ends thereof respectively to said first and second plate means.

46. The improvement according to claim 45, wherein said bearing sleeve and said thrust bearing plates have lubricant passageways in communication with one another, and said second jaw means includes passageway means for supplying lubricant to the lubricant passageways in said bearing sleeve means.

47. The improvement according to claim 34, wherein each said first and second support means has an axially outer side and said first and second plate means are releasably secured respectively to said outer side of said first and second support means.

48. The improvement according to claim 47, wherein said means releasably securing said first and second plate means to said ends of said pivot pin includes at least two threaded fasteners between each plate means and the corresponding end of said pivot pin.

* * * * *